United States Patent [19]

Bakermans

[11] Patent Number: 4,698,892
[45] Date of Patent: Oct. 13, 1987

[54] METHOD OF USING BUNDLE TIES PRODUCED BY THE USE OF TWO PART BUNDLE TIE MATERIAL

[75] Inventor: Johannes C. W. Bakermans, Harrisburg, Pa.

[73] Assignee: AMP Incorporated, Harrisburg, Pa.

[21] Appl. No.: 935,912

[22] Filed: Nov. 28, 1986

Related U.S. Application Data

[62] Division of Ser. No. 836,040, Mar. 4, 1986, Pat. No. 4,646,392.

[51] Int. Cl.⁴ .............................................. B21D 39/00
[52] U.S. Cl. ........................................ 29/452; 29/453; 29/526 R
[58] Field of Search ...................... 29/452, 453, 526 R; 24/30.5 P, 16 PB; 140/93.2

[56] References Cited

U.S. PATENT DOCUMENTS

| 3,014,506 | 12/1961 | Crimmins et al. | 140/93.2 |
|---|---|---|---|
| 3,438,095 | 4/1969 | Evans | 24/16 PB |
| 3,875,620 | 4/1975 | Wells et al. | 24/16 PB |
| 3,914,823 | 10/1975 | Hara | 24/16 PB |
| 3,918,129 | 11/1975 | Hara | 24/16 PB |
| 3,931,838 | 1/1976 | Bakermans | 140/93.2 X |
| 4,045,843 | 9/1977 | Loose | 24/16 PB |
| 4,077,562 | 3/1978 | Ballin | 24/16 PB X |
| 4,150,463 | 4/1979 | Brown | 24/16 PB |
| 4,258,146 | 8/1981 | Choates et al. | 24/16 PB |
| 4,329,762 | 5/1982 | Maidhof | 24/16 PB |
| 4,510,649 | 4/1985 | Yudis et al. | 24/16 PB |
| 4,537,432 | 8/1985 | Meeks | 24/16 PB X |
| 4,573,242 | 3/1986 | Lankton et al. | 24/16 PB |

FOREIGN PATENT DOCUMENTS

| 340105 | 9/1921 | Fed. Rep. of Germany | 24/30.5 R |
|---|---|---|---|
| 2414106 | 10/1974 | Fed. Rep. of Germany | 140/93.2 |
| 1133159 | 11/1968 | United Kingdom | 24/20 EE |

Primary Examiner—Charlie T. Moon
Attorney, Agent, or Firm—Frederick W. Raring; Bruce J. Wolstoncroft

[57] ABSTRACT

Continuous strip material for bundle ties comprises two identical sections. The material is ladder-like in form and each section comprises a side piece and rung parts extending from the side pieces. The rung parts are coupled by a coupling system to form the rungs and the coupling system is disengageable to permit movement of the side pieces away from each other. Ratchet type latching ears are provided on the side pieces. In use, the side pieces are moved apart at the leading end of the strip of material to permit placement of an intermediate portion of the strip between the side pieces at the leading end. The side pieces are moved back together and the intermediate portion can be tightened onto the bundle in a ratchet-like manner.

6 Claims, 16 Drawing Figures

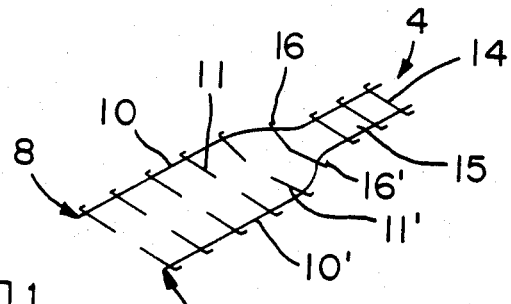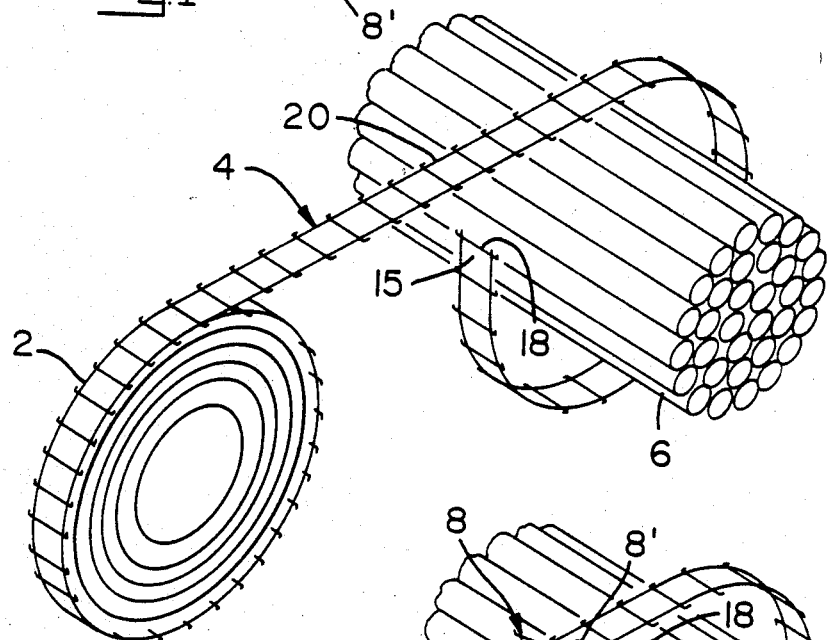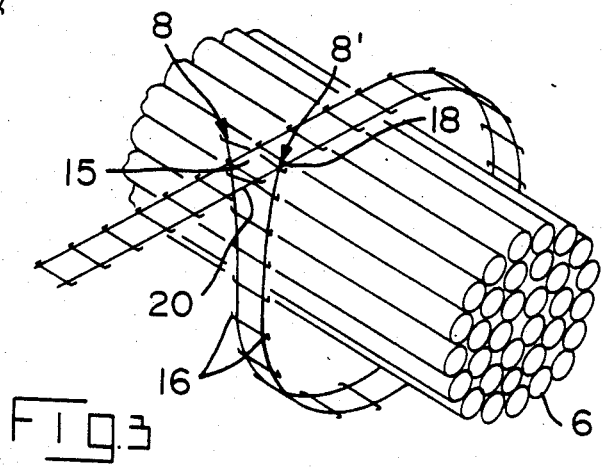

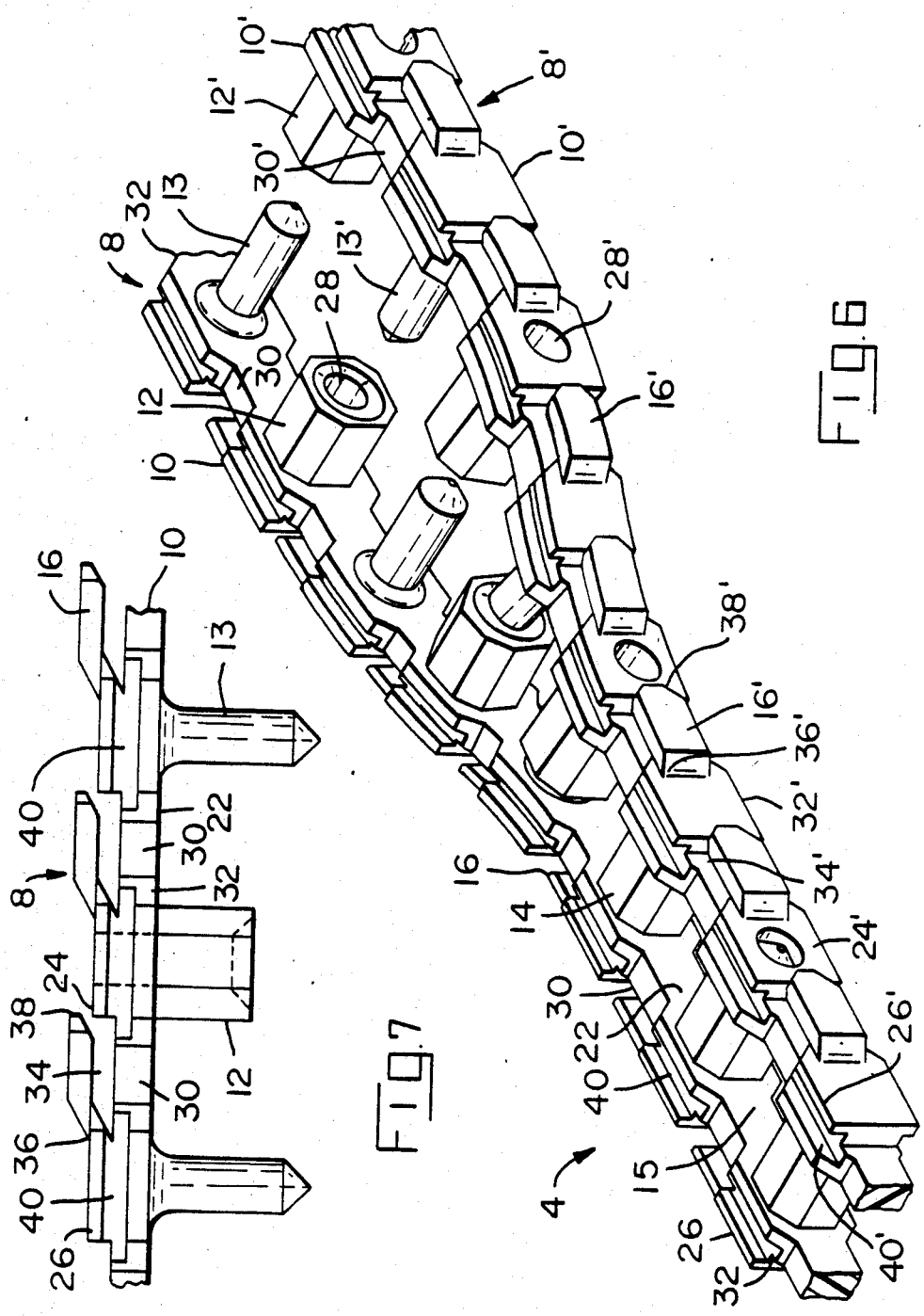

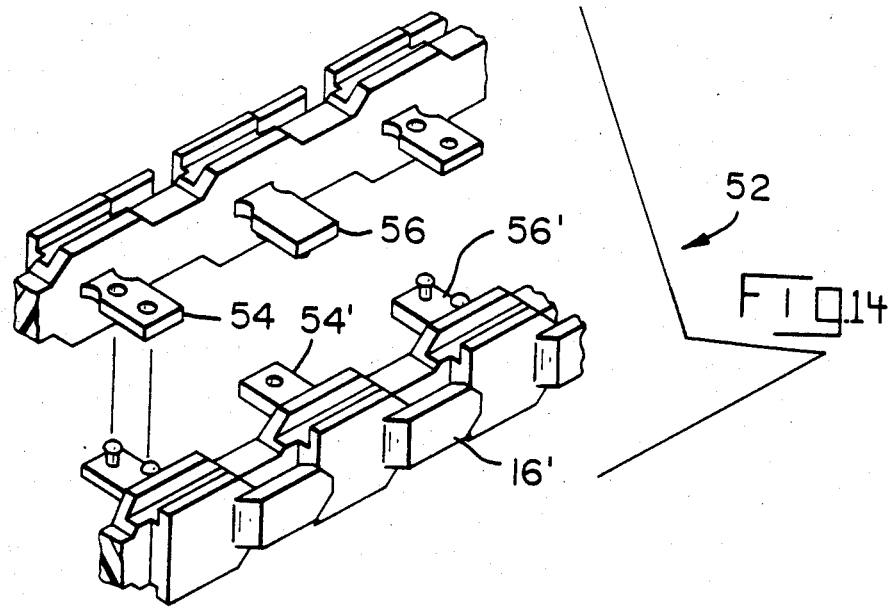
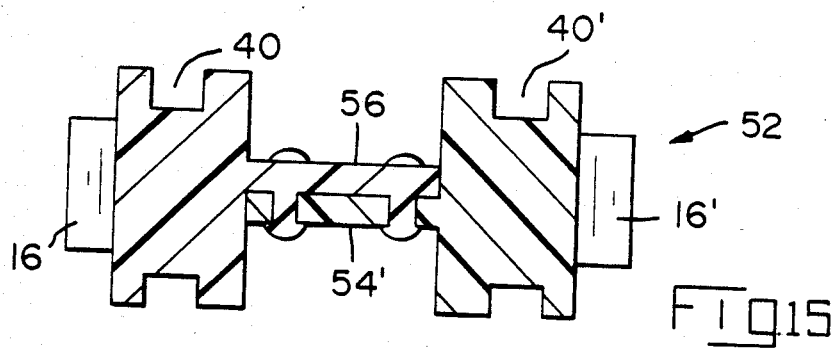
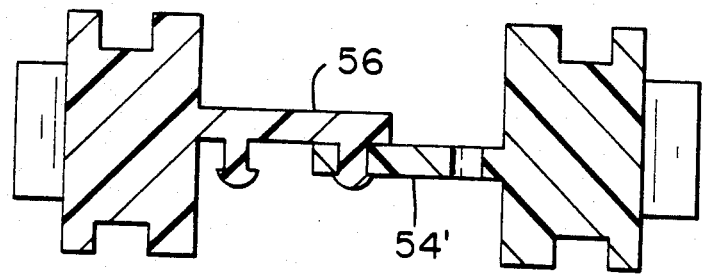

METHOD OF USING BUNDLE TIES PRODUCED BY THE USE OF TWO PART BUNDLE TIE MATERIAL

This is a division of application Ser. No. 836,040 filed Mar. 4, 1986, now U.S. Pat. No. 4,646,392.

FIELD OF THE INVENTION

This invention relates to bundle ties and to continuous strip material for forming bundle ties on wire bundles or the like.

BACKGROUND OF THE INVENTION

A known type of bundle tie material, for forming bundle ties on wire bundles or the like, comprises a continuous strip having spaced-apart openings therein and having ratchet type latching means, such as latching extensions, on its surface. In use, the leading end of the strip is threaded through one of the openings to form a loop and the leading end is then pulled to tighten the loop in the manner of a ratchet mechanism onto the bundle. After the loop has been tightened, the material is cut at two locations; the scrap material extending from the bundle to the leading end of the material is cut and discarded and the length of material extending to the reel or spool is cut also. Bundle tie material of this type is shown, for example, in U.S. Pat. Nos. 3,224,054, 3,438,095, and in 4,045,843.

As noted above, the use of bundle tie material as shown in the above-identified U.S. patent involves a substantial loss of material as scrap when a section of the material is installed on a bundle as a bundle tie. This scrap loss is a serious consideration for the reason that the cost of material in a bundle tie represents a substantial portion of the overall manufacturing costs and the cost of the tie, as installed on the bundle, can be substantially reduced if the scrap loss is eliminated.

It is also difficult with ties of the type described above to thread the leading end of the bundle tie material through an opening in the strip of material which is remote from the leading end to form the loop which is tightened onto the bundle. The difficulty of performing this operation increases as the size of the bundle tie material is reduced and the difficulty encountered approaches the difficulty required to thread a needle if the tie material is extremely narrow. Finally, the nature of the bundle tie material of this known type is such that it is impractical to design automatic or semiautomatic tools for applying the material to bundles as bundle ties.

Bundle ties of the type shown in the above-identified U.S. patents are manufactured by a molding, or sometimes an extrusion operation, coupled with a stamping operation to form the holes in the material. The molding or extrusion operations can be quite inexpensive to carry out. However, the addition of a stamping operation increases the manufacturing cost considerably and the fact that material must be removed from the extruded or molded strip when the holes are stamped in the material also involves a material scrap loss which is undesirable for reasons discussed above.

The present invention is directed to the achievement of an improved bundle tie material which can be manufactured without srcap losses and which can also be applied as an individual bundle without scrap loss by the user. The invention is further directed to the achievement of an improved bundle tie material which provides redundancy in an applied bundle tie on a bundle of wires or the like. The invention is also directed to the achievement of a bundle tie material which can be readily applied by automatic or semiautomatic tools. Additionally, the invention is directed to the achievement of improved bundle ties and improved methods of installing bundle ties on wire bundles or the like. Finally, the invention is considered with a bundle tie material which can be produced as a plastic strip or, if required, as a metal strip.

THE INVENTION

The invention comprises a continuous length of bundle tie material which is intended to be wrapped around a bundle of wires or the like, the bundle tie material having spaced-apart openings therein and a ratchet latching means for latching the material to itself thereby to form a loop. The latching means permits ratchet style tightening of the loop onto a bundle. The bundle tie material of the invention is characterized in that the material has a ladder-like form comprising first and second side pieces and rungs extending between the side pieces, the openings being the spaces between the rungs. The material comprises first and second coextensive sections which are assembled to each other. The first and second sections comprise the first and second side pieces and first and second rung parts respectively. Each first rung part is coupled to a second rung part by a rung coupling means which is at least partially disengageable with accompanying movement of the side pieces away from each other and enlargement of an adjacent opening between adjacent rungs. The ratchet latching means comprises spaced-apart latching ears on each of the side pieces and portions of the side pieces themselves which receive the ears. The material can be applied to a bundle by moving the first and second side pieces away from each other at one location, thereby enlarging the opening at the one location, thereafter positioning a remote portion of the material in the enlarged opening to form a loop, and then moving the side pieces back towards each other. The loop thus formed can be tightened onto a bundle by pulling on the material.

The invention also encompasses the method of installing a bundle tie on a bundle as described above and a new form of bundle tie having a redundant feature in that each single bundle tie device is in reality two separate bands.

THE DRAWING FIGURES

FIG. 1 is a perspective diagrammatic view of a short length of the material illustrating the manner in which the material is formed of two separate sections.

FIGS. 2–4 are diagrammatic views illustrating the manner in which a bundle tie is installed on a bundle.

FIG. 6 is a view similar to FIG. 1 but showing the bundle tie material in detail and illustrating the manner in which it is composed of two identical sections.

FIG. 7 is a top plan view of one of the sections of the bundle tie material.

FIG. 14 is a view showing a further embodiment with the two sections separated from each other.

FIG. 15 is a cross-sectional view through bundle tie material as shown in FIG. 14.

FIG. 16 illustrates the manner in which the two sections of the embodiment of FIG. 14 can be coupled to each other to enlarge an opening in the material.

THE DISCLOSED EMBODIMENT

Figure 4:
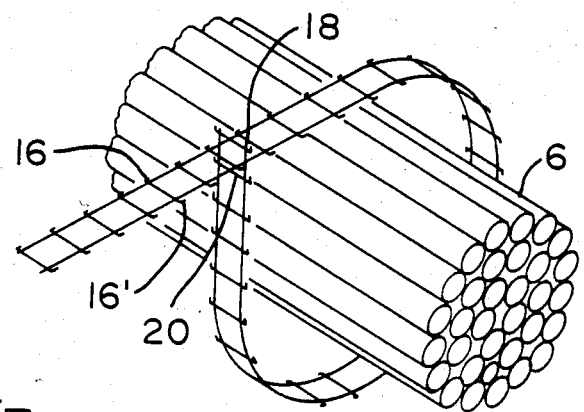

The essential features of the invention will first be described with reference to FIGS. 1-5. These figures show bundle tie material 4 in accordance with the invention in diagrammatic form so that the principles of the invention can be readily understood. The specific structural features of a preferred embodiment are described below with reference to FIGS. 6-11.

The continuous bundle tie material 4 has a ladder-like form and is composed of first and separate identical sections 8, 8', each of which comprises a side piece 10, 10' and rung parts 11, 11'. The two sections 8, 8' are assembled to each other and the rung parts 11, 11' are coupled to each other by a coupling means which permits them to be disengaged from each other. The rung parts form the rungs 14 of the material 4 and the space between the rungs defines holes 15. Latching ears 16, 16' are provided on the side pieces 10, 10'.

The material is manufactured by continuous processes such as strip molding as will be described below and is supplied to the user in the form of a spool or reel 2 as shown in FIG. 2. When it is desired to place an individual bundle tie on a bundle of wires 6, the leading end 18 of the material 4 is passed around the bundle and the two sections 8, 8' are separated as shown in FIG. 3, thereby to open the hole 15 at the leading end 18. An intermediate portion 20 of the material is moved into the opened hole as shown in FIG. 3 and the two sections are then moved back towards each other as shown in FIG. 4. As will be explained below, the rung parts 11 are designed such that they will be coupled to each other even though the side pieces 10, 10' are separated in the vicinity of the leading end by a distance which is slightly greater than the normal separation along the length of the material.

After the side pieces have been moved towards each other, the intermediate portion 20 can be pulled leftwardly as shown in FIG. 4 and a ratcheting effect will be achieved. When the loop is tigtened onto the bundle, the intermediate portion is cut immediately adjacent to the leading end 18 so that there is absolutely no scrap loss when the bundle tie is formed on the wire bundle. The cut end of the installed tie is thus the trailing end of a discrete length of material 4.

The structural details of one embodiment of the invention will now be described with reference to FIGS. 6-11. The sections 8, 8' are identical and the same reference numerals, differentiated by prime marks, are used to denote the same structural features of the two sections. In the description which follows, only the first section 8 is described in detail and reference is made to the second section 8' where necessary. The first side piece 10 has a first internal surface 22 which is opposed to the first internal surface 22' of the side piece 10' and a first outwardly facing external surface 24. Intermediate surfaces 26 are formed between these internal and external surface on the upper and lowe rsides of the material as viewed in FIG. 6.

The first rung parts extend from the internal surface 22 and are shown at 12 and 13. The first rung parts 13 are cylindrical pins while the first rung parts 12 are projections on the internal surface which have cylindrical recesses or openings 28 for reception of a second rung part 13' as shown by FIG. 6. The pins 13, 13' should fit in the openings 28, 28' relatively snugly so that the two sections will remain assembled to each other but can be separated when a bundle tie is being formed on a wire bundle.

The side piece 10 has spaced-apart latching portions 30 which are relatively thinner, as measured between the surfaces 22, 24, than adjacent portions 32 of the side piece. Spaced-apart recesses 34 are thus provided on the outwardly facing first external surface of the side piece for reception of the latching ears. The latching ears 16 have fixed ends 36 which are integral with the adjacent portions 32 and extend towards the leading end 18 of the material. The ears have ends 38 which are adjacent to the next adjacent portion 32 of the side piece and the ears extend over the adjacent recess 34. The ears 16 can be flexed inwardly and into the recesses during tightening of a loop of the material onto a bundle as described below.

The top and bottom intermediate surface portions 26 of the side pieces 10 have channels therein as shown at 40 for reception of a tool which can be used to separate the two sections of the material when a bundle tie is being produced. The channels would, of course, receive portions of the tool but other contoured surface types could be provided if desired for cooperation with a suitable tool.

Figure 8:
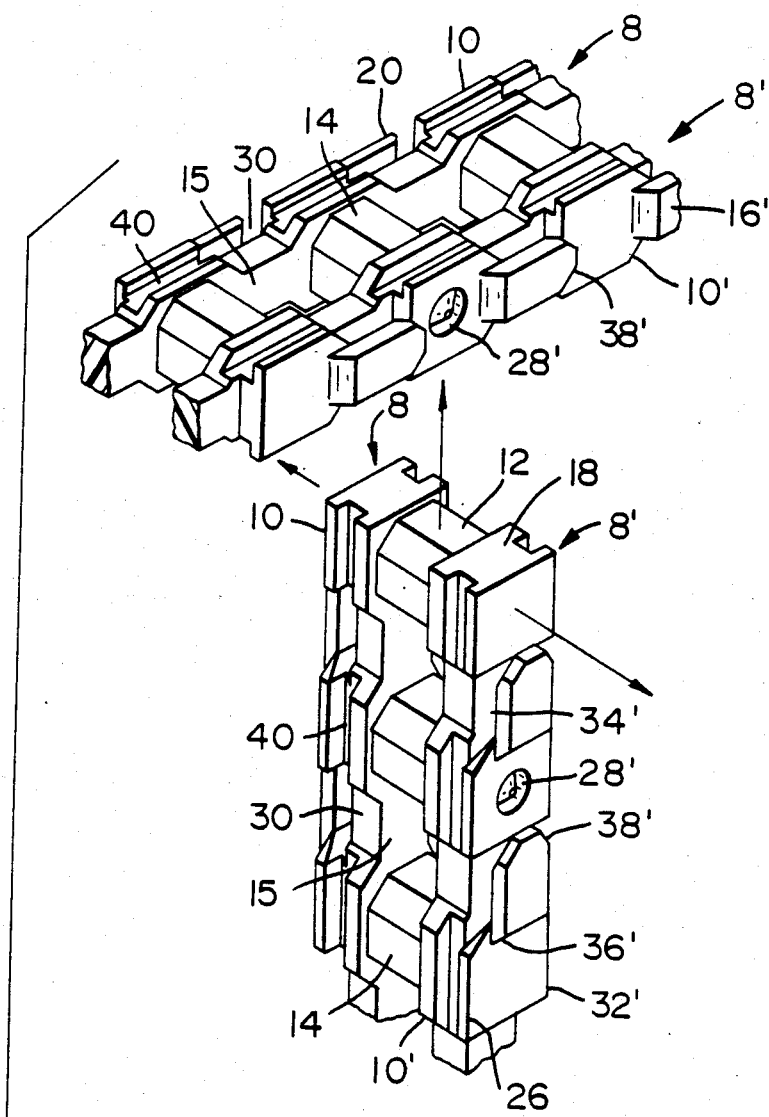
FIGS. 8–10 are fragmentary views showing the manner in which an intermediate portion of the material is placed in an opening at the leading end of the material to form a loop so that the loop can be tightened onto a bundle of wires.
Figure 9:
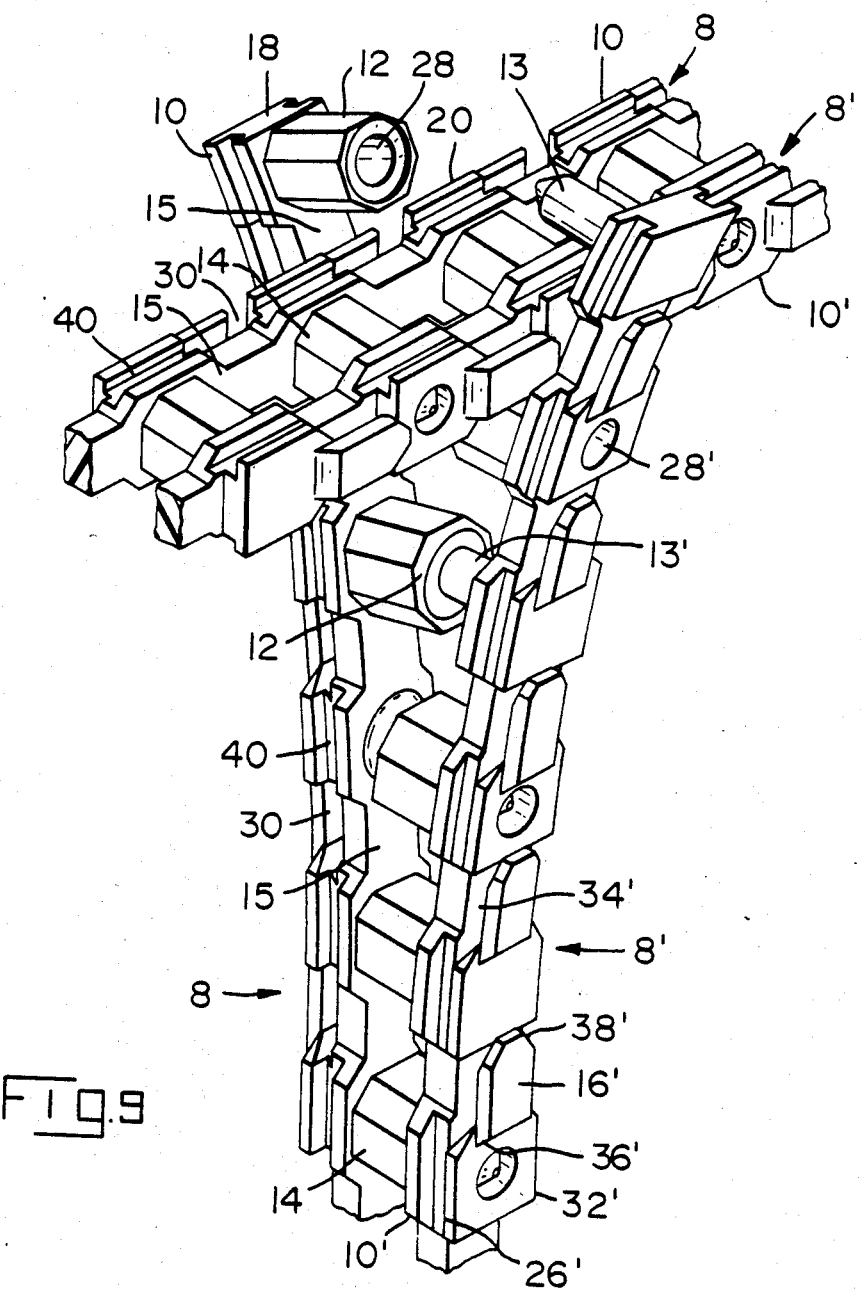
Figure 10:
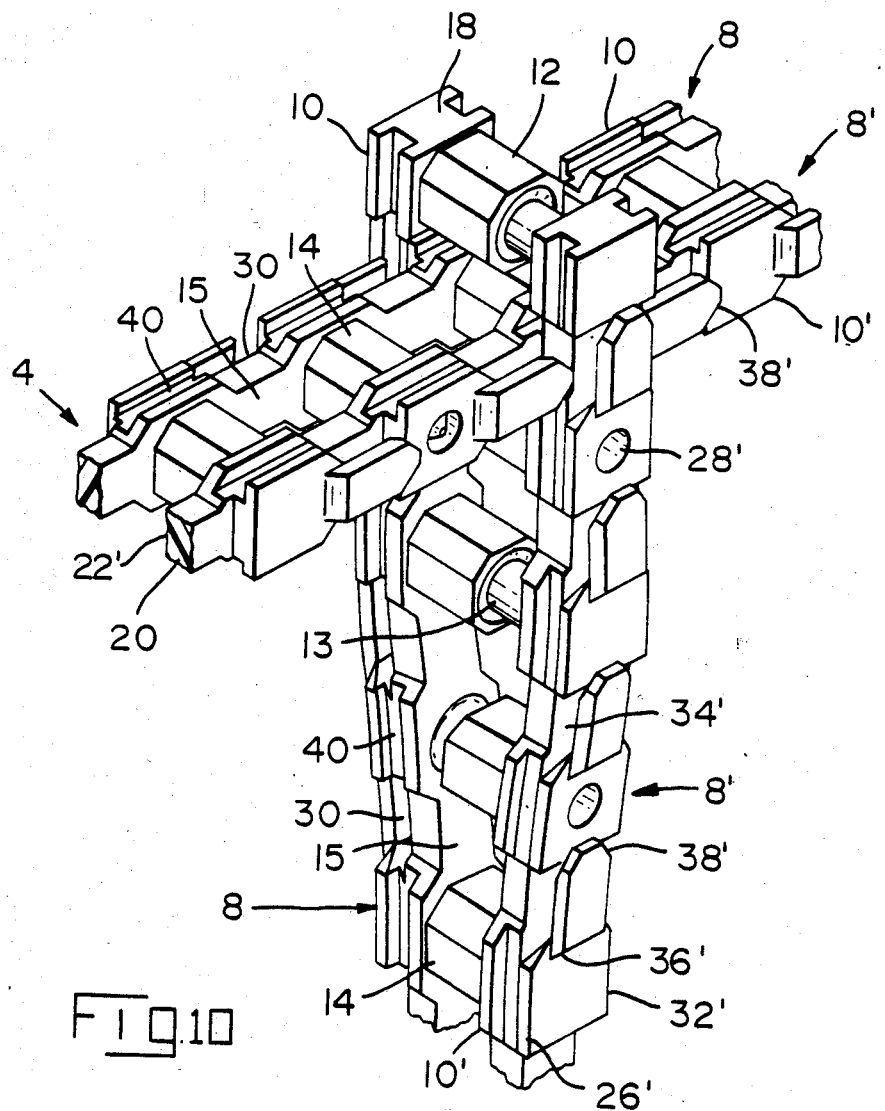
Figure 11:
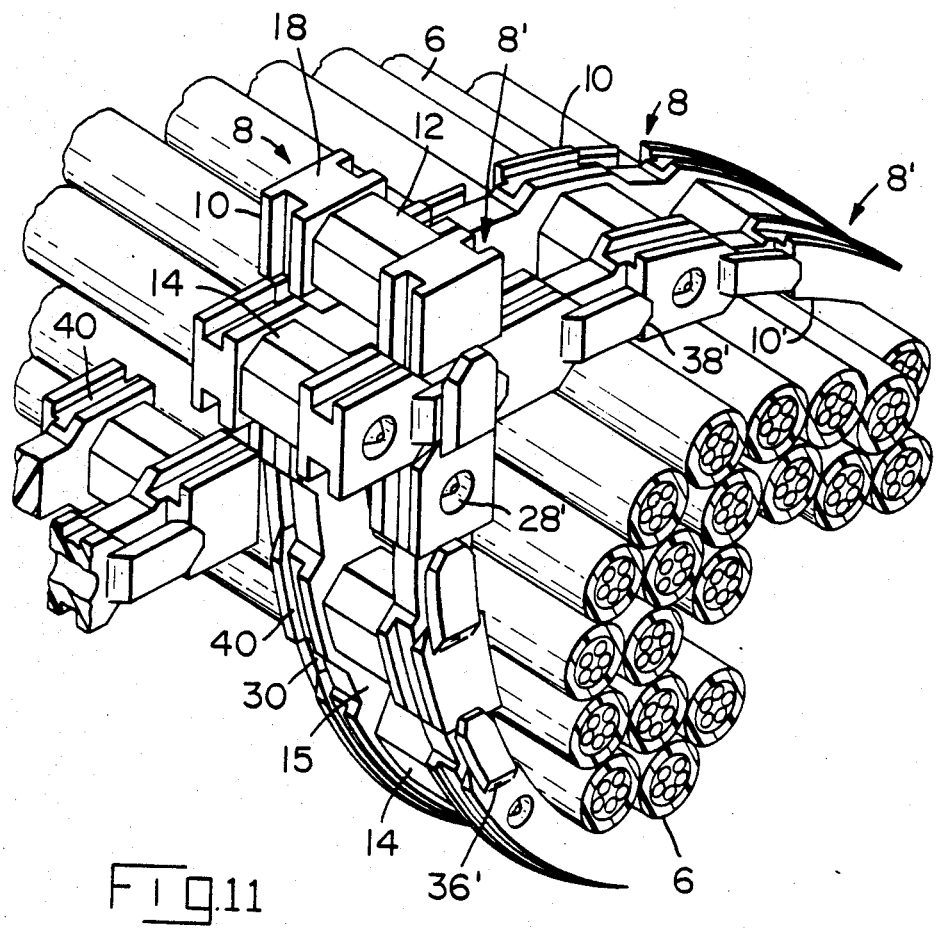
FIG. 11 is a view showing a bundle of tie formed from the material on a bundle of wires.

FIGS. 8-10 illustrate in detail the manner in which an individual bundle tie is formed from a continuous length of the material. As also shown in FIGS. 2-4, the leading end 18 of the material is passed around a wire bundle and positioned adjacent to an intermediate portion 20 of the material. The two sections 8, 8' are then moved apart as shown in FIG. 9 and the hole at the leading end is opened so that the intermediate portion 20 of the material can now be passed downwardly until it is between the two sections at the leading end. Thereafter, the two sections at the leading end are moved back towards each other as shown in FIG. 10 and the leading end hole is closed. Obviously, these two sections will be spaced apart at the leading end by a distance which is slightly greater than the spacing between the two sections at other locations along the length of the material. The telescoping effect of the rung parts permits this effect.

When the parts are in the positions of FIG. 10, the intermediate portion 20 of the material can be pulled leftwardly to draw the bundle tie material tightly around the bundle of wires. as the individual first and second latching ears 16, 16' pass through the opening at the leading end, the ears can flex inwardly for the reason that they extend cantilever fashion over the adjacent recesses 34. After an individual ear has passed through the opening at the leading end of the material, it snaps back to its normal position and it cannot pass rightwardly from the position of FIG. 10 through the opening. In this manner, the latching effect is achieved along with the ratchetting effect.

Figure 12:
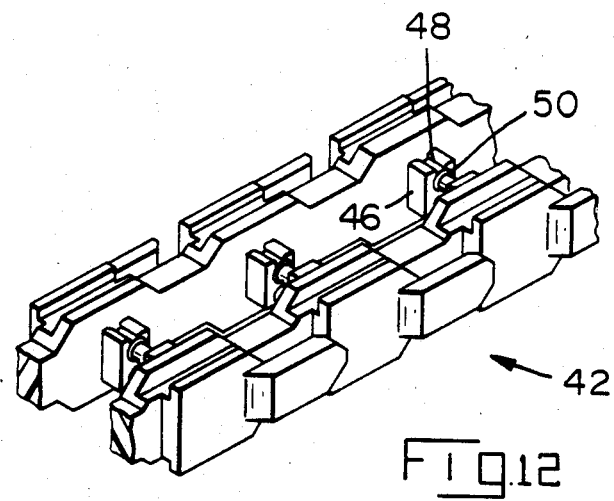
FIG. 12 is a perspective view of a short length of bundle tie material in accordance with an alternative embodiment.
Figure 13:
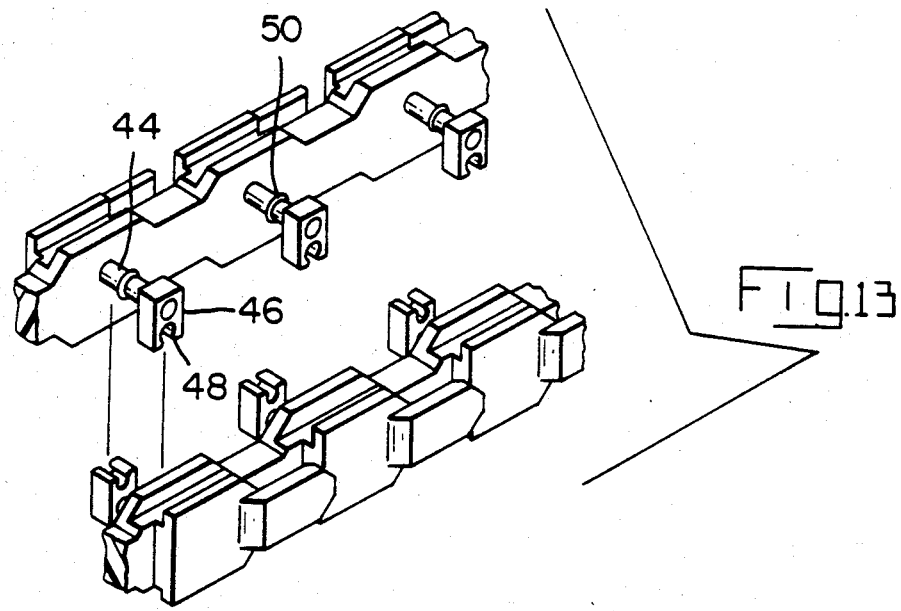
FIG. 13 is a view showing the two sections separated from each other.

FIGS. 12 and 13 show an alternative embodiment of bundle tie material 42 in which the rung parts 44 are cylindrical and have enlarged ends 46 in which there is provided an open-sided recess 48 dimensioned to receive the cylindrical portion 44. When the side sections are moved apart with this embodiment, they are moved in opposite directions normally of the plane of the material as shown in FIG. 13 and then moved laterally away from each other to the extent necessary to permit placement of the intermediate portion between the side pieces at the leading end. A collar 50 may be provided to maintain the spacing between the two sections.

FIGS. 14–16 show a further embodiment 52 in which the rung parts 54, 56 are plate-like projections on the internal opposed side surfaces of the side pieces. The parts 54 have openings therein which receive cylindrical pin-like projections on the part 56. Again, separation takes place by moving the two sections in oposite directions normally of their own planes. As shown in FIG. 16, the hole at the leading end can be enlarged by virtue of the fact that two pins and two openings are provided in each of the projections 54, 56.

As an alternative to the installation procedure shown in FIGS. 1–5, it is possible to form a bundle tie from a continuous length of the material by simply separating the two sections at the intermediate location 20 and passing the leading end of the material through the separated intermediate sections. This alternative has the disadvantage of resulting in some scrap loss when the ends are pulled and tightened onto the bundle. The preferred assembly method is as shown in the drawing.

Bundle ties in accordance with the invention will ordinarily be of a plastic material such as a polyester or polypropylene. However, the structural features shown in the drawing can also be achieved by stamping and forming and there is a need for metallic bundle ties in some industries, particularly in the nuclear power industry. When the tie material is molded, it is advantageous to produce the two separate sections 8, 8' by a continuous rotary molding machine of the type shown in U.S. Pat. No. 4,080,148. The manufacturing cost with this type of process is very low since it is merely necessary to provide a single molding wheel having two sets of cavities to produce the two sections. When the sections emerge from the molding wheel, they are simply guided towards each other as shown in FIG. 1 and assembled to each other immediately after being molded.

Bundle tie material in accordance with the invention can be made in a wide variety of sizes. The principles of the invention have been used with success to produce bundle tie material having a width of about 0.2 inches (5 mm) and having a pitch of about 0.15 inches (3 mm). It is, of course, possible to produce bundle tie material having a much greater width and longer pitch, for example having a width of one inch or more if bundle ties are required for relatively heavy gauge wires.

As mentioned previously, an outstanding advantage of the invention is that there is absolutely no scrap loss in the manufacture of the material (as is involved in punching openings in previously known bundle tie material) or in forming a bundle tie on a bundle of wires. This feature is extremely significant from an economic standpoint for the reason that the material cost represents a very substantial portion of the overall manufacturing cost of any bundle tie device. A further significant advantage of the invention is that the operations of separating the side pieces and placing the intermediate portion 20 of the material between these separated side pieces can readily be carried out by hand or by relatively simple tooling devices. In this respect, the invention has substantial advantages over bundle tie materials of the type in which stamped openings are provided in the strip. The passage of the leading end of the material through a stamped opening which has a width narrower than the width of the material itself is a difficult operation which is avoided in the practice of the invention.

Figure 5:
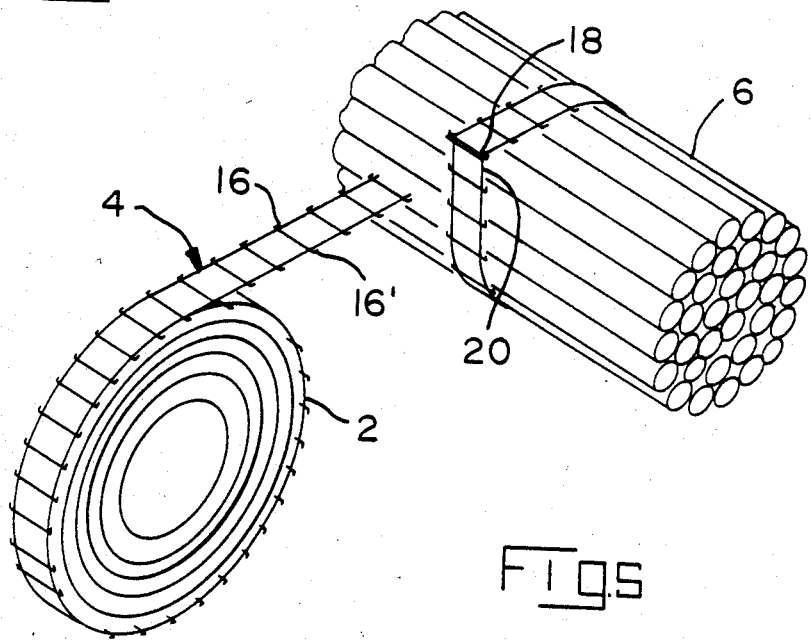
FIG. 5 is a diagrammatic view of a bundle tie installed on a bundle of wires.

The performance of bundle tie devices formed with the material of the present invention is, in at least one respect, superior to the performance of previously known bundle tie devices for the reasons that each single bundle tie as shown for example in FIG. 5 is in effect, two individual bundle ties on the bundle of wires. The rungs 14 as shown in FIG. 5 are not load bearing portions of the applied bundle tie; that is, they are not stressed and all of the hoop stresses are carried by the side pieces 10, 10' and the latching means on these side pieces. It is therefore possible to cut every one of the rungs in a bundle tie on a wire bundle without failure of the two side pieces which are now two independent bundle ties. This feature is clearly advantageous since the destruction, accidental or otherwise, of any of the rungs and one of the side pieces does not result in failure of the bundle tie; a second side piece remains to form a continuous tie device in surrounding relationship to the wire bundle. In other words, a bundle tie in accordance with the invention has the advantage of redundancy.

I claim:

1. A method of installing a bundle tie on a bundle of wires or the like by the use of a continuous strip of bundle tie material, the material having a leading end and having spaced apart holes therein, one of the holes being the leading end hole and being located at the leading end, the leading end hole being openable and closable and the material having ratchet latching means thereon, the method comprising the steps of:

passing the leading end around the bundle thereby forming a loop and positioning the leading end adjacent to an intermediate portion of the material, opening the leading end hole and positioning the intermediate portion in the opened leading end hole, closing the leading end hole so that the intermediate portion extends through the leading end hole.

pulling on the intermediate portion and thereby tightening the loop onto the bundle to provide a ratchet latching effect with the leading end hole wall, and cutting the intermediate portion at a location adjacent to the bundle whereby, a bundle tie is provided on the bundle with no scrap loss of the material.

2. A method of installing a bundle tie formed from a continuous length of material onto a bundle of wires or the like, the continuous length of material having a leading end and having spaced apart holes therein, the method comprising the steps of:

passing a leading end of the continuous length of material around the bundle and positioning the leading end adjacent to an intermediate portion of the material, thereby forming a section of the material into a loop around the bundle;

separating sections of the leading end of the material such that an opening is provided between the sections of the leading end, the opening being connected to the hole in the material nearest the leading end;

moving the intermediate portion of the material through the opening and positioning the intermediate portion in the hole nearest the leading end; and reengaging the sections of the leading end, closing the opening, and thereby securing the intermediate portion in the hole nearest the leading end; and applying a force to the intermediate portion of the material, causing the intermidate portion to provide a ratcheting effect on the leading end, the ratcheting effect tightening the material around the bundle.

3. A method of installing bundle ties as recited in claim 2 comprising the further step of cutting the intermediate portion of the material adjacent to the leading end, such that the discrete section around the bundle forms the bundle tie, and the cut end of the continuous length of material becomes the leading end of the next bundle tie, thereby eliminating scrap material.

4. A method of installing bundle ties on wire bundles or the like comprising the steps of:

passing a leading end of a continuous length of bundle tie material around the wire bundle or the like, such that the leading end is adjacent an intermediate portion of the material;

separating sections of the leading end such that an opening is provided in the leading end, the opening being connected to a hole provided in the continuous length of bundle tie material;

placing an intermediate portion of the material in the hole, between the sections of the leading end;

returning the sections of the leading end to proximate their original position, thereby closing the opening and securing the intermediate portion in the hole of the material, and forcing the intermediate portion through the hole of the bundle tie material, causing the intermediate portion to provide a ratcheting effect on the leading end, the ratcheting effect tightening the material around the bundle.

5. A method of installing bundle ties as recited in claim 4, wherein the ratcheting effect on the leading end is provided by allowing ears of the material to flex inwardly as it passes through the holes, the ears snapping back into their unflexed position after they have passed through the hole, the configuration of the ears preventing the ears from returning back through the opening, such that as the intermediate portions are forced through the holes, a latching and ratcheting effect occurs, maintaining the bundle tie material around the bundle.

6. A method of installing bundle ties as recited in claim 5 comprising the further step of cutting the intermediate portion of the bundle tie material adjacent to the leading edge, such that the discrete section around the bundle forms the bundle tie, and the cut end of the continuous length of material becomes the leading end of the next bundle tie, thereby eliminating scrap material.

* * * * *

UNITED STATES PATENT AND TRADEMARK OFFICE
CERTIFICATE OF CORRECTION

PATENT NO. : 4,698,892
DATED : October 13, 1987
INVENTOR(S) : Johannes C.W. Bakermans It is certified that error appears in the above-identified patent and that said Letters Patent is hereby corrected as shown below:

Column 7, line 3, claim 2, delete "and".

Signed and Sealed this

Seventh Day of June, 1988

*Attest:*

DONALD J. QUIGG

*Attesting Officer*  *Commissioner of Patents and Trademarks*